(12) United States Patent
Yue et al.

(10) Patent No.: US 7,217,584 B2
(45) Date of Patent: May 15, 2007

(54) BONDED THIN-FILM STRUCTURES FOR OPTICAL MODULATORS AND METHODS OF MANUFACTURE

(75) Inventors: Cheisan J. Yue, Roseville, MN (US); Thomas Keyser, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 331 days.

(21) Appl. No.: 10/915,081

(22) Filed: Aug. 10, 2004

(65) Prior Publication Data

US 2005/0208694 A1   Sep. 22, 2005

Related U.S. Application Data

(60) Provisional application No. 60/554,457, filed on Mar. 18, 2004.

(51) Int. Cl.
H01L 21/00 (2006.01)

(52) U.S. Cl. ............... 438/31; 438/106; 438/455

(58) Field of Classification Search ........... 438/22–31, 438/106–107, 455; 117/918; 257/E31.001
See application file for complete search history.

(56) References Cited

U.S. PATENT DOCUMENTS

| | | | |
|---|---|---|---|
| 4,886,345 A | 12/1989 | Popek | |
| 5,029,978 A | 7/1991 | Curtis et al. | |
| 5,383,048 A | 1/1995 | Seaver | |
| 5,408,566 A * | 4/1995 | Eda et al. | 385/131 |
| 5,500,544 A | 3/1996 | Park et al. | 257/296 |
| 5,696,662 A | 12/1997 | Bauhahn | 361/297.1 |
| 6,108,212 A | 8/2000 | Lach et al. | 361/768 |
| 6,270,604 B1 * | 8/2001 | McCallion et al. | 156/99 |
| 6,372,609 B1 | 4/2002 | Aga et al. | |
| 6,418,999 B1 | 7/2002 | Yanagita et al. | |
| 6,493,502 B1 | 12/2002 | Deliwala | 385/140 |
| 6,526,187 B1 | 2/2003 | Deliwala | 385/11 |
| 6,546,538 B1 | 4/2003 | Rubdi et al. | 716/12 |
| 6,566,155 B1 * | 5/2003 | Numai | 438/31 |
| 6,603,166 B2 | 8/2003 | Fechner et al. | |
| 6,603,889 B2 | 8/2003 | Deliwala | 385/8 |

(Continued)

FOREIGN PATENT DOCUMENTS

WO    WO 03/077015 A1    9/2003

OTHER PUBLICATIONS

"A high-speed silicon optical modulator based on metal-oxide-semiconductor capacitor," Ansheng Liu et al., NATURE, vol. 427, (Feb. 12, 2004), 615-618, 4 pgs.

(Continued)

*Primary Examiner*—Savitri Mulpuri
(74) *Attorney, Agent, or Firm*—McDonnell Boehnen Hulbert & Berghoff LLP (57) ABSTRACT

The present invention provides silicon based thin-film structures that can be used to form high frequency optical modulators. Devices of the invention are formed as layered structures that have a thin-film dielectric layer, such as silicon dioxide, sandwiched between silicon layers. The silicon layers have high free carrier mobility. In one aspect of the invention a single crystal silicon material is bonded to a thin-film dielectric material to form a silicon-insulator-silicon thin-film structure for an optical modulator.

18 Claims, 6 Drawing Sheets

U.S. PATENT DOCUMENTS

| | | | |
|---|---|---|---|
| 6,608,945 B2 | 8/2003 | Deliwala | 385/2 |
| 6,611,636 B2 | 8/2003 | Deliwala | 385/14 |
| 6,625,348 B2 | 9/2003 | Deliwala | 385/27 |
| 6,646,747 B2 | 11/2003 | Deliwala | 356/477 |
| 6,654,511 B2 | 11/2003 | Deliwala | |
| 6,658,173 B2 | 12/2003 | Delwala | 385/15 |
| 6,671,443 B2 | 12/2003 | Deliwala | 358/125 |
| 6,690,844 B2 | 2/2004 | Deliwala | 385/2 |
| 6,690,863 B2 | 2/2004 | Deliwala | 385/50 |
| 6,738,546 B2 | 5/2004 | Deliwala | 385/50 |
| 6,748,125 B2 | 6/2004 | Deliwala | 385/2 |
| 6,760,498 B2 | 7/2004 | Delwala | 385/14 |
| 6,816,636 B2 * | 11/2004 | Cole et al. | 385/10 |
| 6,823,112 B2 | 11/2004 | Deliwala | 385/37 |
| 6,826,320 B2 | 11/2004 | Deliwala | 385/14 |
| 6,842,546 B2 | 1/2005 | Deliwala | 385/14 |
| 6,845,198 B2 | 1/2005 | Montgomery et al. | 385/50 |
| 6,869,881 B2 | 3/2005 | Deliwala | 438/689 |
| 6,879,751 B2 | 4/2005 | Deliwala | 385/25 |
| 6,891,685 B2 | 5/2005 | Deliwala et al. | 359/831 |
| 6,891,985 B2 | 5/2005 | Delwala | 385/14 |
| 6,895,136 B2 | 5/2005 | Deliwala | 385/14 |
| 6,897,498 B2 | 5/2005 | Gothoskar et al. | 257/226 |
| 6,898,352 B2 | 5/2005 | Delwala | 385/40 |
| 6,912,330 B2 | 6/2005 | Deliwala | 385/14 |
| 6,917,730 B2 | 7/2005 | Ghiron et al. | 385/14 |
| 6,934,444 B2 | 8/2005 | Ghiron et al. | 385/36 |
| 6,944,369 B2 | 9/2005 | Deliwala | 385/30 |
| 6,947,615 B2 | 9/2005 | Deliwala | 385/5 |
| 6,963,118 B2 | 11/2005 | Deliwala | 257/428 |
| 6,968,110 B2 | 11/2005 | Patel et al. | 385/131 |
| 6,980,720 B2 | 12/2005 | Gothoskar et al. | 385/43 |
| 6,987,910 B2 | 1/2006 | Shappir et al. | 385/37 |
| 6,993,225 B2 | 1/2006 | Patel et al. | 385/43 |
| 6,993,243 B2 | 1/2006 | Delwala | 385/147 |
| 7,000,207 B2 | 2/2006 | Gothoskar et al. | 716/8 |
| 7,013,067 B2 | 3/2006 | Ghiron et al. | 385/39 |
| 7,020,364 B2 | 3/2006 | Ghiron et al. | 385/36 |
| 7,118,682 B2 * | 10/2006 | Patel et al. | 216/24 |
| 7,149,388 B2 * | 12/2006 | Keyser et al. | 385/40 |
| 2002/0003650 A1 | 1/2002 | Usami et al. | |
| 2003/0054639 A1 | 3/2003 | Deliwala | 438/689 |
| 2003/0063364 A1 | 4/2003 | Kambe | |
| 2003/0151793 A1 | 8/2003 | Sugiyama et al. | |
| 2004/0002197 A1 | 1/2004 | Fathimulla et al. | |
| 2004/0021157 A1 | 2/2004 | Yue et al. | |
| 2004/0041232 A1 | 3/2004 | Keyser | |
| 2004/0208454 A1 | 10/2004 | Montgomery et al. | |
| 2004/0223768 A1 | 11/2004 | Shastri et al. | 398/183 |
| 2004/0258347 A1 | 12/2004 | Gothoskar et al. | 385/14 |
| 2005/0094938 A1 | 5/2005 | Ghiron et al. | 385/36 |
| 2005/0094939 A1 | 5/2005 | Ghiron et al. | 385/36 |
| 2005/0110108 A1 | 5/2005 | Patel et al. | 257/453 |
| 2005/0123232 A1 | 6/2005 | Piede et al. | 385/14 |
| 2005/0135727 A1 | 6/2005 | Piede et al. | 385/14 |
| 2005/0152658 A1 * | 7/2005 | Keyser | 385/129 |
| 2005/0179986 A1 | 8/2005 | Gothoskar et al. | 359/321 |
| 2005/0189591 A1 | 9/2005 | Gothoskar et al. | 257/347 |
| 2005/0194990 A1 | 9/2005 | Gothoskar et al. | 324/765 |
| 2005/0201683 A1 | 9/2005 | Ghirono et al. | 385/39 |
| 2005/0207691 A1 * | 9/2005 | Keyser et al. | 385/1 |
| 2005/0213873 A1 | 9/2005 | Piede et al. | 385/14 |
| 2005/0214989 A1 * | 9/2005 | Keyser | 438/155 |
| 2005/0220405 A1 | 10/2005 | Shappir et al. | 385/37 |
| 2005/0236619 A1 | 10/2005 | Patel et al. | 257/57 |
| 2005/0289490 A1 | 12/2005 | Shastri et al. | 716/4 |
| 2006/0018597 A1 | 1/2006 | Piede et al. | 385/39 |
| 2006/0063679 A1 * | 3/2006 | Yue et al. | 505/190 |
| 2006/0083144 A1 | 4/2006 | Piede et al. | 369/100 |

OTHER PUBLICATIONS

"Strained Silicon on Insulator. A Quick Guide to the Technology, the Processes, the Products," George Celler, Chief Scientist and Michael Wolf, Sr. VP Sales & Marketing, SOITEC, Jul. 2003, 1-4, 4 pgs.

"Smart Cut™. A guide to the Technology, the Process, the Products," George Celler, Chief Scientist and Michael Wolf, Sr. VP, Sales & Marketing, SOITEC, Jul. 2003, 1-8, 8 pgs.

"Design Methodology of the High Performance Large-Grain Polysilicon MOSFET," Singh Jagar et al., IEEE Transactions on Electron Devices, vol. 49, No. 5, May 2002, 795-801, 7 pgs.

"Optical Transmission Losses in Polycrystalline Silicon Strip Waveguides: Effects of Waveguide Dimensions, Thermal Treatment, Hydrogen Passivation, and Wavelengh," Ling Liao et al., Journal of Electronic Materials, vol. 29, No. 12, 2000, 1380, 1 pg.

U.S. Non-Provisional Patent Application; filed even date herewith, entitled, "Low Loss Contact Structure for Silicon Based Optical Modulators and Methods of Manufacture", Applicant: Thomas Keyser et al.

U.S. Non-Provisional Patent Application; filed even date herewith, entitled, "Silicon-Insulator-Silicon Thin-Film Structures for Optical Modulators and Methods of Manufacture", Applicant: Thomas Keyser et al.

"A gigahertz silicon-on-insulator Mach-Zehnder modulator," Samara-Rubio, D. et al., Optical Fiber Communication Conference, 2004 OFC 2004 Los Angeles, CA Feb. 23-25, 2004 vol. 2, Feb. 26, 2004, pp. 701-703.

PCT International Search Report Dated Jul. 1, 2005.

Liu et al., "A High-Speed Silicon Optical Modulator Based on a Metal-Oxide-Semiconductor Capacity," Nature, vol. 427, Feb. 12, 2004. www.nature.com.

* cited by examiner

BONDED THIN-FILM STRUCTURES FOR OPTICAL MODULATORS AND METHODS OF MANUFACTURE

This application claims the benefit of U.S. Provisional Application Ser. No. 60/554,457, filed Mar. 18, 2004, entitled "Silicon Based Optical Modulators and Methods of Manufacture," which disclosure is incorporated herein by reference in its entirety for all purposes.

TECHNICAL FIELD

The present invention relates to silicon based optical modulators for optical transmission systems. More particularly, the present invention relates to silicon based thin-film phase-shifter structures for use in optical modulators that use a bonding technique to provide at least a portion of a device layer in the structure and methods of making such structures.

BACKGROUND

The state of the art in optical communication networks, particularly that related to photonics based components for use in such networks, has advanced rapidly in recent years. Present applications require, and future application will demand, that these communication systems have the capability to reliably transfer large amounts of data at high rates. Moreover, because these networks need to be provided in a cost efficient manner, especially for "last mile" applications, a great deal of effort has been directed toward reducing the cost of such photonic components while improving their performance.

Typical optical communications systems use fiber optic cables as the backbone of the communication system because fiber optics can transmit data at rates that far exceed the capabilities of wire based communication networks. A typical fiber optic based communication network uses a transceiver based system that includes various types of optoelectronic components. Generally, a transceiver includes a light source, means to convert an electrical signal to an optical output signal, and means to convert an incoming optical signal back to an electrical signal. A laser is used to provide the source of light and a modulator is used to turn the light source into an information bearing signal by controllably turning the light on and off. That is, the modulator converts the light from the laser into a data stream of ones and zeroes that is transmitted by a fiber optic cable. The incoming optical signal can be converted back to an electrical signal by using components such as amplifiers and photodetectors to process the signal.

Commercially used optical modulators are either lithium niobate based devices or compound semiconductor based devices such as the III–V based devices that use gallium arsenide or indium phosphide material systems. Additionally, silicon based devices have been developed. However, silicon based optical modulator technology has not been able to provide a device that can perform like the commercially available products and many problems need to be solved before such silicon based devices can compete with the commercially available lithium niobate and compound semiconductor devices.

Lithium niobate devices rely on an electrooptic effect to provide a modulating function. That is, an electric field is used to change the refractive index of the material through which the light is traveling. These devices are usually provided as a Mach-Zehnder interferometer. In this type of modulator, an incoming light source is divided and directed through two separate waveguides. An electric field is applied to one of the waveguides, which causes the light passing through it to be out of phase with respect to the light in the other waveguide. When the light emerges from both waveguides and recombines, it interferes destructively, effectively turning the light off.

In contrast, compound semiconductor based devices rely on an electroabsorption effect. In this type of modulator an applied electric field is also used, but not to vary the refractive index of the material through which the light is propagating. In a compound semiconductor material, an electric field can be used to shift the absorption edge of the material so that the material becomes opaque to a particular wavelength of light. Therefore, by turning the electric field on and off, the light can be turned on and off.

One problem with lithium niobate based modulators is that as the data transfer rate increases for these devices, so must the size of the device itself. This requires more material, which can increase cost. These modulator devices are often integrated into packages with other components where the demand for smaller package sizes is continually increasing. Therefore, modulator size is a concern. Another problem with lithium niobate based devices is that the drive voltage can be somewhat high as compared to compound semiconductor devices. Accordingly, because a large voltage change between the on and off state is more difficult to produce than a lower voltage swing, the drive electronics required to provide such large voltage changes are typically relatively expensive and can introduce more cost to the systems.

Compound semiconductor modulator devices can be made extremely small and are not limited by the size restrictions of lithium niobate based devices. Moreover, these devices can handle high data transfer rates at relatively low drive voltages. However, current compound semiconductor based modulators, such as those fabricated from the indium phosphide material system, have certain limitations. In particular, these devices can suffer from problems related to coupling losses and internal absorption losses, which are generally not present in lithium niobate based devices.

As an additional concern, the processing and manufacture of compound semiconductor based devices is expensive when compared to silicon based devices, for example. One reason for this is that many of the base materials used for compound semiconductor processing are expensive and difficult to handle. For example, indium phosphide wafers are presently limited in size and the largest wafers are expensive. This makes low cost high volume manufacturing difficult as compared to that which can potentially be obtained in the manufacture of silicon based devices.

Regarding silicon based technology, a silicon based modulator can be designed to function in a manner that is similar to the way a lithium niobate based device functions in that it changes the phase of the light passing through a waveguide. This phase change can be used in a Mach-Zehnder type device to form a modulator. More particularly, a silicon based device generally operates on the principle that a region of high charge concentration can be used to shift the phase of light in the waveguide. Importantly, the magnitude of the phase shift is proportional to the charge concentration and the length of the charged region in a direction in which the light travels. Thus, the ability to create a region of sufficient charge density to interact with the light is essential to be able to induce a phase change, especially one that can shift the phase by an amount suitable for use in a Mach-Zehnder type device.

In order to provide a charged region that can be used for phase shifting, these devices are known to use injection of electrons or depletion of holes in a diode or triode type device. In operation, a concentration of charge carriers can be provided in an active portion of a guiding region of a waveguide in these devices. One parameter that is important in a silicon based optical modulator is the speed in which a charged region can be created and subsequently dissipated. More particularly, the speed at which charge carriers can be generated as well as the speed at which charge carries can be removed (by recombination, for example) affects the speed at which modulation can be performed. These generation and recombination processes are directly related to the mobility of the charge carriers in the particular material. Because these devices use both single crystal silicon and non-single crystal silicon and because the mobility of charge carriers in non-single crystal silicon is significantly lower than the mobility of charge carriers in single crystal silicon, the low mobility non-single crystal material unfortunately limits the rate at which the device can modulate light.

SUMMARY

The present invention thus provides silicon based thin-film structures that are capable of rapidly creating and removing a charged region for shifting the phase of light passing through the structure. In accordance with the present invention, high frequency optical modulators can be formed using silicon-insulator-silicon thin-film structures. In order to provide a charged region for phase shifting, in accordance with the present invention, devices of the present invention are preferably formed as layered structures that have an insulator layer, such as silicon dioxide, sandwiched between silicon layers. A concentration of charge carriers can be provided in a region adjacent to each silicon/oxide interface by applying an electrical bias across the silicon layers. This effectively moves charge carriers from the bulk silicon material toward the oxide layer so they build up in a region near the interface.

One parameter that is important in this type of device is the speed in which a charged region can be created. This speed is directly related to the mobility of the charge carriers in the particular material. Therefore, in one embodiment, a high performance device can be provided when both silicon layers comprise high-mobility silicon such as crystalline silicon. High mobility material is particularly preferred for the active portion of the waveguide of the device. Moreover, to function as an optical modulator, such devices preferably include structure of appropriate materials for rapidly altering the free carrier concentration across the optical path of a waveguide and preferably the structure is defined to confine and guide the light through the waveguide without degrading or attenuating the signal.

The present invention provides silicon-insulator-silicon structures for optical modulators having first and second silicon layers with each preferably comprising active regions comprising high free carrier mobility silicon. Such silicon-insulator-silicon structures are desirable for high speed optical signal modulation (greater than $1 \times 10^9$ hertz, for example). Preferably, silicon that has a bulk free carrier mobility of at least 500 centimeters$^2$/volt-second (cm$^2$/V-s) at room temperature (if n-type silicon is used) and at least 200 cm$^2$/V-s at room temperature (if p-type silicon is used) is provided as starting material to form a thin-film optical modulator structure in accordance with one aspect of the present invention. That is, this high mobility silicon may be provided and further doped to form an active region of a silicon layer for an optical modulator structure, which doping can change, and typically lowers the mobility of the active region from the initial value. Preferably, such an active region is doped to a level sufficient to achieve the desired modulation performance. In any case, the doped active region is considered to have a high free carrier mobility in accordance with the present invention if it is formed from a material that has a free carrier mobility as set forth above.

It has been estimated that speeds in excess of $1 \times 10^9$ hertz and as high as or greater than $10 \times 10^9$ hertz can be realized when the active region of the second silicon layer has a mobility that is at least 20%–25% of the mobility of the active region of the first silicon layer. Accordingly, the second silicon layer is preferably formed from silicon material that has a mobility that is at least 20%–25% of the mobility of the material that is used to form the first silicon layer. To further improve the modulation performance, it is preferable to have the second layer mobility at about 50%, and most preferably close to 100%. Thus, the initial silicon material for forming the active region of the second silicon layer preferably has a mobility of about 50%, and most preferably close to 100% of the initial silicon material for the active region of the first silicon layer.

Accordingly, in one aspect of the present invention, a method of forming a silicon based thin-film structure for an optical modulator is provided. The method generally comprises positioning a first substrate with respect to a second substrate thereby forming a silicon-insulator-silicon thin-film structure. The first substrate preferably comprises a silicon-on-insulator structure. The silicon-on-insulator structure preferably includes a silicon layer and a buried oxide layer. The silicon layer preferably comprises an exposed silicon surface. The second substrate also preferably comprises an exposed silicon surface. A thin-film dielectric layer having a predetermined thickness is preferably provided on at least one of the exposed silicon surface of the silicon layer of the first substrate and the exposed silicon surface of the second substrate.

In another aspect of the present invention a silicon-insulator-silicon thin-film structure for an optical modulator is provided. The thin-film structure preferably comprises a substrate having a silicon layer and a buried oxide layer formed thereon. A thin-film dielectric layer having a predetermined thickness is preferably positioned between the silicon layer of the substrate and a second silicon layer. The structure also preferably comprises an interface formed by thermal bonding wherein the interface comprises at least a portion of the thin-film dielectric layer.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
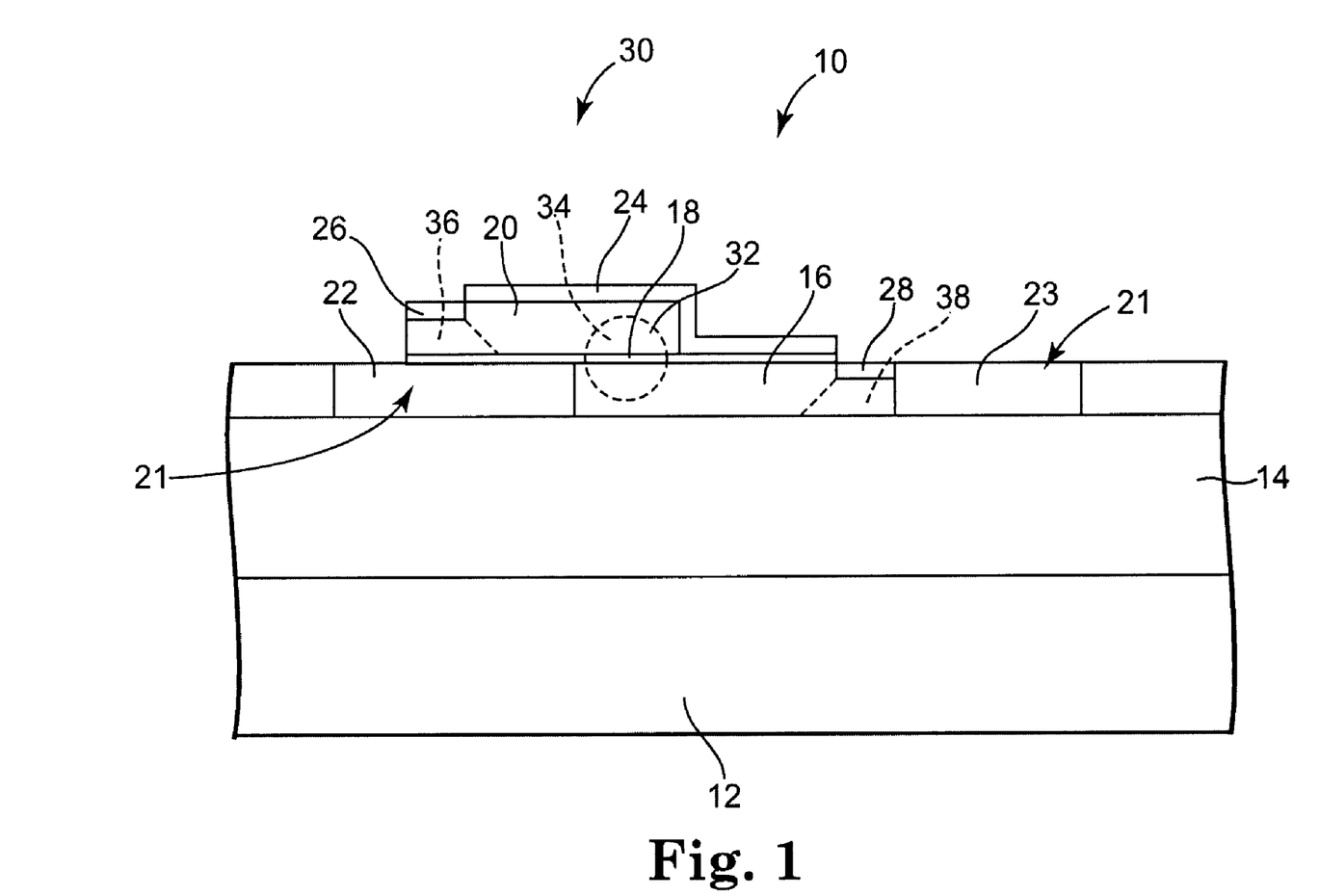
FIG. 1 is a schematic cross-sectional view of an exemplary layered thin-film silicon-insulator-silicon structure in accordance with the present invention that can be used to form an optical modulator.

In FIG. 1, a first embodiment of an optical modulator 10 in accordance with the present invention is schematically illustrated in cross-section. As shown, the optical modulator 10 includes a substrate 12, preferably silicon, an insulator that preferably comprises buried oxide layer 14, and a first silicon layer 16. Preferably, the first silicon layer 16 and the buried oxide layer 14 are provided as a silicon-on-insulator structure, as conventionally known. However, the modulator 10 does not require use of silicon-on-insulator technology and may be formed by other techniques including in particular those described below. Silicon-on-insulator structures are preferred because of their compatibility with conventional complementary metal oxide semiconductor (CMOS) processing. As such, the optical functionality of an optical modulator (which itself is an electro-optical device) can be integrated with the electrical functionality of devices such as transistors, resistors, capacitors, and inductors on the same substrate. These electro-optical and electrical devices can be formed by using the common processing techniques to provide optical circuits that are integrated with electrical circuits. Moreover, silicon-on-insulator technology provides an easy way to provide a high quality single crystal layer and to electrically isolate plural devices that can be formed in the silicon layer from each other.

The modulator 10 also preferably includes a thin-film dielectric layer 18 sandwiched between the first silicon layer 16 and a second silicon layer 20. In one preferred embodiment, the thin-film dielectric layer 18 comprises a silicon dioxide layer. Also, the first silicon layer 16 preferably comprises an electrically isolated layer. That is, the silicon layer 16 is preferably surrounded by an insulating material in order to laterally and vertically isolate the silicon layer 16. Preferably, as described in more detail below, a silicon-on-insulator substrate is used and a conventionally known shallow trench isolation process can be used to laterally isolate the silicon layer 16 from other adjacent devices formed on the same substrate. The buried oxide layer of the silicon-on-insulator structure can thus provide vertical isolation. As such, the silicon layer 16 (or silicon island) can be structurally isolated by the thin-film dielectric layer 18 and a surrounding oxide filled trench 21, which includes portions 22 and 23 that can be seen in cross-section.

Although preferred, silicon-on-insulator technology does not need to be used. Any conventionally known or future developed technique capable of functioning in the same manner to sufficiently isolate device structures for forming high frequency optical modulators in accordance with the present invention can be used. In particular, such structures generally require sufficient lateral as well as horizontal isolation to functionally isolate devices from each other. For example, it is contemplated that conventionally known techniques such as deep trench isolation or local oxidation of silicon (LOCOS) can be used to laterally isolate device structures. Regarding vertical isolation, any technique that is conventionally known or future developed for sufficiently vertically isolating the silicon layer 16 in accordance with the present invention may be used.

An oxide layer 24 is also preferably provided, as illustrated, and is preferably designed in order to at least partially define a waveguide 30 that extends for a predetermined distance in a direction of propagation of an electromagnetic field through the waveguide 30. That is, the oxide 24 preferably assists to confine light in the waveguide 30. A propagating electromagnetic field is also referred to as light herein. As shown, the waveguide 30 is preferably at least partially defined by the thin-film dielectric 18 and the first and second silicon layers 16 and 20, respectively.

The waveguide 30 functions to confine and guide light propagating through a guiding region 32 of the waveguide 30. In order to illustrate this guiding and confining functionality, a mode 34 of an electromagnetic field that can propagate through the guiding region 32 of the waveguide 30 is illustrated schematically. More specifically, the waveguide 30 is preferably designed for single mode transmission. That is, the waveguide 30 is preferably designed so that the lowest order bound mode (also called the fundamental guided mode or trapped mode) can propagate at the wavelength of interest. For typical optical communications systems, wavelengths in the near infra-red portion of the electromagnetic spectrum are typically used. For example, wavelengths around 1.55 microns are common.

Thin-film structures and techniques for designing such structures for optical waveguides are well known and any structure capable of confining and guiding light in accordance with the present invention can be used. For example, such waveguides may include interfaces between thin-film materials having different refractive index, which interfaces can be used in order to guide and confine light in accordance with the present invention. Moreover, graded index regions, such as can be formed by controllably varying the composition of a material, may be used to guide and confine light as is well known.

The first silicon layer 16, the thin-film dielectric layer 18, and the second silicon layer 20 are also preferably designed to be capable of modulating light that is traveling through the guiding region 32 of the waveguide 30. More specifically, at least a portion of the guiding region 32 of the waveguide 30 is preferably designed to include an active region. Accordingly, the first silicon layer 16 and the second silicon layer 20 are preferably operatively doped to form active regions (or doped regions) in the first and second silicon layers 16 and 20. Preferably, the first and second silicon layers, 16 and 20, are doped in a region or area where it is desired to rapidly alter the free carrier concentration across the optical path of the light propagating through the guiding region 32 of the waveguide 30. As described below, the silicon layer 16 can be p-type and the silicon layer 20 can be n-type or vice versa. Preferably, the active regions are sufficiently doped in order to achieve a desired modulation or switching speed.

Also, the modulator 10 preferably includes a first electrical contact 26 for providing a contact to the silicon layer 20 and a second electrical contact 28 for providing a contact to silicon layer 16. As shown the contacts 26 and 28 are preferably spaced apart from the active portion of the guiding region 32 in order to minimize optical losses that can be caused by metals as are preferably used in such contacts. Low loss contact structures and methods of forming such contacts that can be used in accordance with the present invention are disclosed in commonly owned co-pending U.S. patent application 10/915,607 having Attorney Docket No. HON0006/US, entitled LOW LOSS CONTACT STRUCTURES FOR SILICON BASED OPTICAL MODULATORS AND METHODS OF MANUFACTURE, filed on even date herewith, the entire disclosure of which is fully incorporated herein by reference for all purposes.

Preferably, the contacts 26 and 28 are formed as low resistance ohmic contacts wherein current varies linearly with applied voltage. Accordingly, the second silicon layer 20 preferably includes a highly doped region 36 that at least partially forms the contact 26. For example, a highly doped region is preferably doped to between $5 \times 10^{17}/cm^3$ and $2 \times 10^{18}/cm^3$. Likewise, the first silicon layer 16 preferably includes a highly doped region 38 that at least partially forms the contact 28. The regions 36 and 38 are preferably doped to correspond with the doping of the respective silicon layer. That is, if the first silicon layer 16 is p-type, the region 38 is also preferably p-type. Similarly, if the second silicon layer 20 is n-type, the region 36 is also preferably n-type. Any contacts capable of providing an electrical bias to the guiding region 30, thereby forming an active region in accordance with the invention, are contemplated and can be used. Such ohmic contacts are well known by those in the art of complementary metal oxide semiconductor (CMOS) processing.

In operation, a phase shift can be produced in light passing through the waveguide 30 by applying an electrical bias across the structure. This bias activates the doped first and second silicon layers, 16 and 20, which thereby causes charge carriers to move toward the dielectric layer 18. In particular, contacts 26 and 28 can be used to provide a bias across the first and second silicon layers, 16 and 20, as the mode 34 passes through the guiding region 32 of the waveguide 30. Charge carriers in the active (doped) regions of the first and second silicon layers, 16 and 20, move toward the dielectric layer 18 and build up so as to provide regions of charge concentration that together can produce a phase shift in the light. This phase shift can be used to modulate light where the modulator 10 is provided as an arm of a Mach-Zehnder interferometer, for example.

The first and second silicon layers, 16 and 20, and the dielectric layer 18 form an optical device capable of providing a desired phase shift to light passing through the structure. The structure also functions like a capacitor, at least in the sense that charge carriers move toward the dielectric layer in response to an applied electric field. The structure is preferably not designed for use as a charge storage device (an electrical capacitor) because such a storage device may require contact metal positioned near the active portion of the device, which metal can cause optical losses. Moreover, the structure of the present invention preferably comprises a sandwich structure comprising active silicon (highly doped) layers rather than a body layer as used in a typical transistor.

As noted above, the first silicon layer 16 is preferably formed from a layer of a silicon-on-insulator structure because such silicon-on-insulator structures are readily available commercially with a top silicon layer that comprises a single crystal silicon layer, which can have a high free carrier mobility. For example, a high free carrier mobility is generally greater than at least 500 $cm^2/V$-s at room temperature for n-type silicon and at least 200 $cm^2/V$-s at room temperature for p-type silicon. It is noted that these values for free carrier mobility represent preferred values for the bulk material (or initial starting material) that is used to form the first silicon layer 16. That is, as described below, the first silicon layer 16 is preferably formed from an initial silicon material that has a high free carrier mobility and is subsequently doped to provide a functional device layer or active region for an optical modulator, which doping may change, and typically lowers, the free carrier mobility of a portion of the initial silicon layer. Accordingly, an active region of a device layer of an optical modulator in accordance with the present invention may have a free carrier mobility that is different from another portion of the same device layer. In any case, it is preferably to start with a silicon material that has a high free carrier mobility, as set forth above, and form an active region from (or in) that initial material.

In accordance with the present invention, the silicon layer 20 is preferably provided such that the silicon layer 20 has a free carrier mobility that is as close to the free carrier mobility of the silicon layer 16 as possible (as measured before doping to form active device layers for an optical modulator). For example, in one embodiment of the present invention, the silicon layer 20 can be formed by a layer transfer process that may include a bonding process that can be used to form a silicon-insulator-silicon thin-film structure wherein each of the silicon layers can comprise single crystal silicon.

Figure 2:
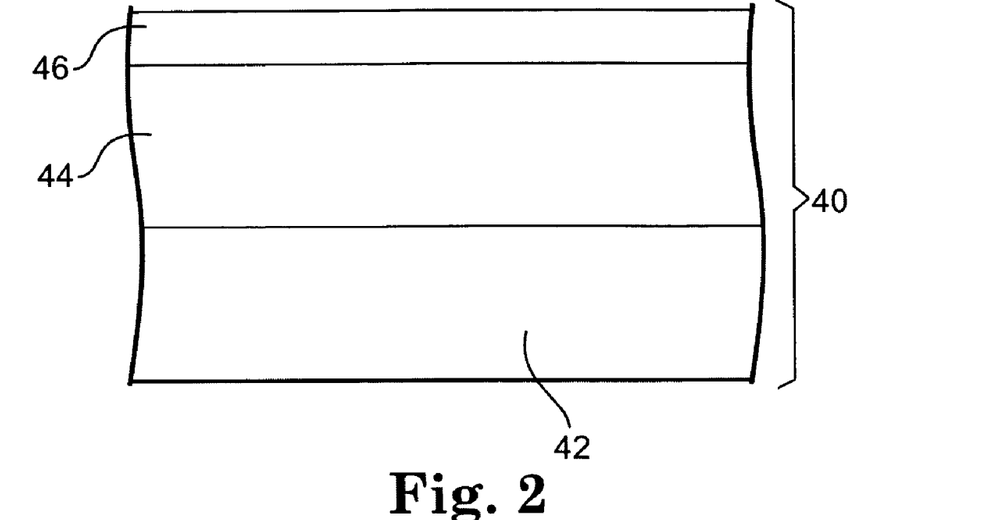
FIG. 2 is a schematic cross-sectional view of a silicon-on-insulator substrate that can be used to form a layered thin-film silicon-insulator-silicon structure in accordance with an embodiment of the present invention such as the layered thin-film silicon-insulator-silicon structure shown in FIG. 1.

Optical modulators in accordance with the present invention, such as the optical modulator 10 shown in FIG. 1, can be made as described below. Preferably, conventional CMOS processing techniques can be used although any other known or developed techniques can be used instead or in combination. Referring to FIG. 2, a silicon-on-insulator structure 40 that includes a substrate 42 (typically silicon), buried oxide layer 44, and first silicon layer 46 is illustrated. Such silicon-on-insulator substrates are commercially available. The thickness of the buried oxide layer 44 and the thickness of the silicon layer 46 are preferably selected by considering certain desired properties of the particular optical modulator to be made, such as the dimensions and/or structure of the device, as well as the processing techniques to be used. Also, the silicon layer 46 preferably has a high free carrier mobility. Preferably, if n-type silicon is used, the silicon layer 46 has a free carrier mobility of at least 500 cm$^2$/V-s at room temperature. If p-type silicon is used, the silicon layer 46 preferably has a free carrier mobility of at least 200 cm$^2$/V-s at room temperature.

Figure 6:
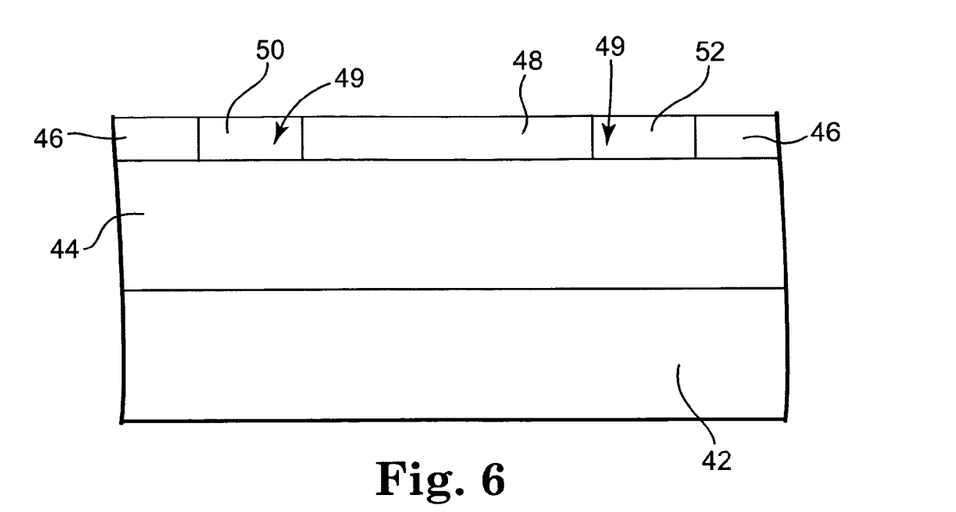
FIG. 6 is a schematic cross-sectional view of the layered structure of FIG. 5 after partial removal of the covering dielectric layer and removal of the thin-film dielectric etch stop layer, thus leaving a first electrically isolated silicon device layer having an exposed surface.

Preferably, a portion of the silicon layer 46 is electrically isolated to form a first device layer 48 as shown in FIG. 6. Such electrical isolation facilitates the formation of plural devices on the same substrate. In the illustrated embodiment, an oxide filled trench 49 is used to define the first device layer 48 by forming a border of dielectric material around the device perimeter. As shown in cross-section, the oxide trench 49 includes oxide portions 50 and 52 as part of the surrounding trench 49 that isolates the first device layer 48 from the remainder of silicon layer 46. The buried oxide layer 44 isolates the first device layer 48 from below so that an electrically isolated island of silicon can be created as the first device layer 48. This can be done, for example, by shallow trench isolation (STI) or local oxidation of silicon (LOCOS) procedures as known in conventional CMOS processing.

Figure 3:
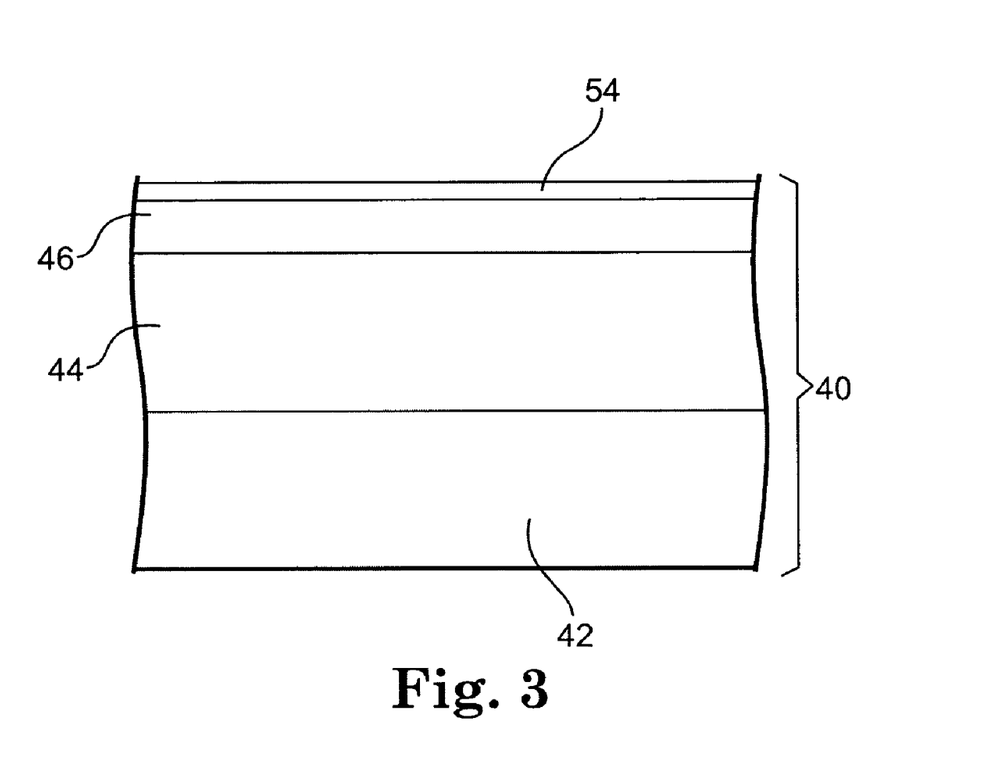
FIG. 3 is a schematic cross-sectional view of the silicon-on-insulator substrate of FIG. 2 showing in particular a thin-film etch stop layer that has been provided on a silicon layer of the silicon-on-insulator substrate to form a layered structure.
Figure 4:
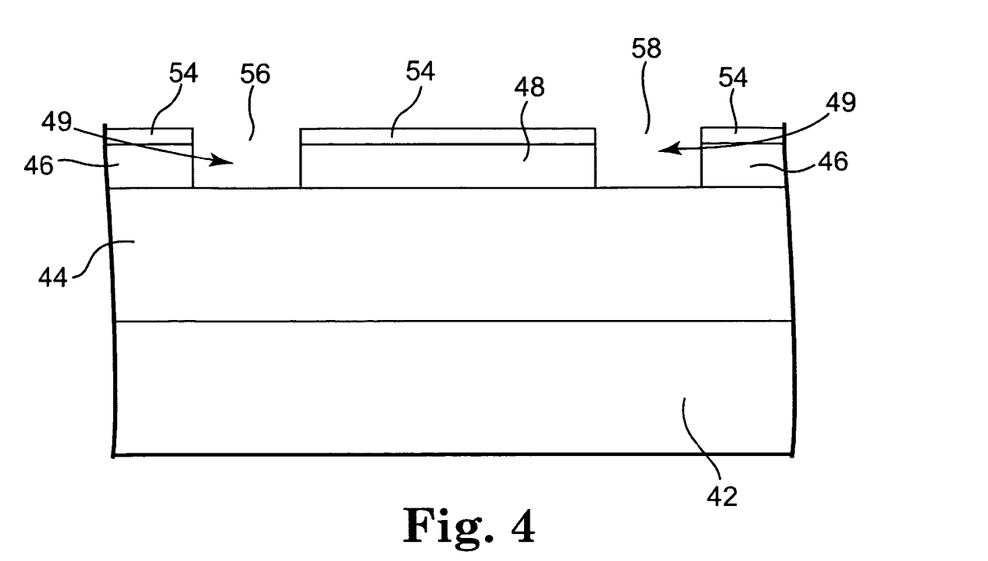
FIG. 4 is a schematic cross-sectional view of the layered structure of FIG. 3 showing in particular channels that are provided to isolate a portion of the silicon layer of the silicon-on-insulator structure in accordance with an aspect of the present invention.
Figure 5:
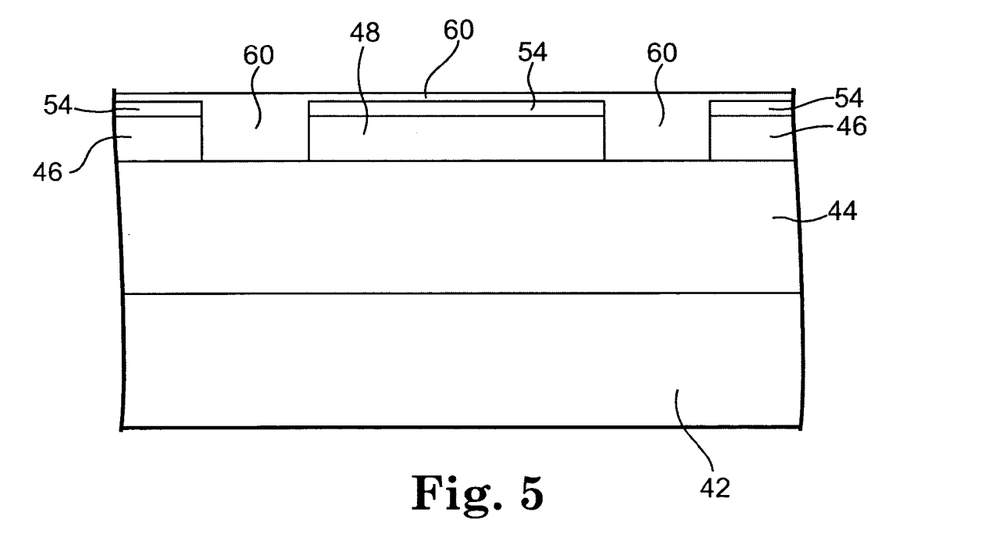
FIG. 5 is a schematic cross-sectional view of the layered structure of FIG. 4 with a thin-film dielectric layer covering the thin-film dielectric etch stop layer and filling the channels.

In a typical trench isolation process, an etch stop layer 54, (see FIG. 3) such as a silicon nitride layer, is first deposited on the silicon layer 46. Next, conventionally known masking and etching processes are used to form trench 49 as shown in FIG. 4 (trench portions 56 and 58 are shown in cross-section). The buried oxide layer 44, as shown, defines the depth of the trench 49. Accordingly, the trench 49 preferably defines the first device layer 48 as an island. An oxide layer 60 is then provided to fill the trench 49 as shown in FIG. 5, which step also may cover the etch stop layer 54, as shown. Next, the oxide layer 60 over the first silicon device layer 48 and silicon layer 46 of the structure shown in FIG. 5 can be planarized, such as by using chemical mechanical processing (CMP). Then, the etch stop layer 54 (which would preferably be relatively very thin) can be removed, such as by, for example, an acid bath that can selectively remove the etch stop layer 54 from the silicon layer 46 and the first device layer 48. The structure shown in FIG. 6 can thus be provided wherein the first device layer 48 is electrically isolated from the silicon layer 46 by the oxide trench 49 and the buried oxide layer 44. While shallow trench isolation with silicon-on-insulator technology is preferred, other techniques as described above, can be used. Moreover, any known or developed methods for planarizing or removing materials are contemplated, and such processes may be conducted by any number of combined steps of multiple varieties.

Preferably, the first device layer 48 is doped to form a p-type active region for an optical modulator but the first device layer 48 may be doped to form an n-type active region if desired. Such doping can be done before the trench 49 is formed or after the trench is formed. However, such doping is preferably performed in a manner that minimizes the possibility of undesirable thermal diffusion of dopant species. Dopants such as boron can be used to form p-type regions and dopants such as arsenic, phosphorus, and antimony can be used to form n-type active regions. Preferably, the first device layer 48 is doped sufficiently to provide a p-type material suitable for use in optical modulation. Conventionally known photolithography and ion implantation processes may be used, for example, to perform the material doping. It is noted that such doping may change the free carrier mobility of the first device layer 48 such that it is different from the free carrier mobility of the initial silicon layer 46. In any case, it is preferred to start with a high mobility material such as the silicon layer 46 to form the first device layer 48. Additionally, as mentioned above, the first device layer 48 is preferably sufficiently doped to form an active region capable of achieving the desired modulation performance. For example, by starting with the silicon layer 46 with the above noted free carrier mobility, an active region can be formed that is capable of achieving high modulation performance (greater that 1×10$^9$ hertz).

Figure 7:
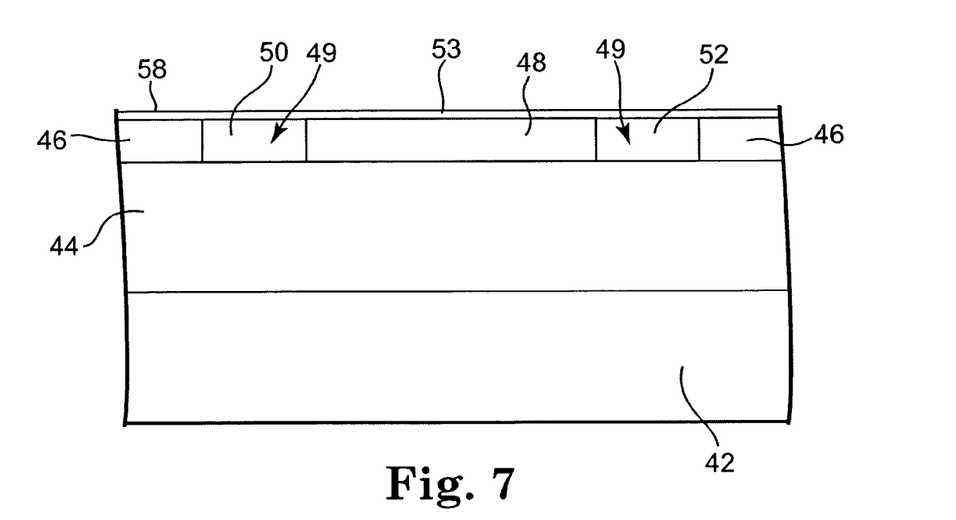
FIG. 7 is a schematic cross-sectional view of the layered structure of FIG. 6 with a functional thin-film dielectric device layer provided over the first silicon device layer.
Figure 10:
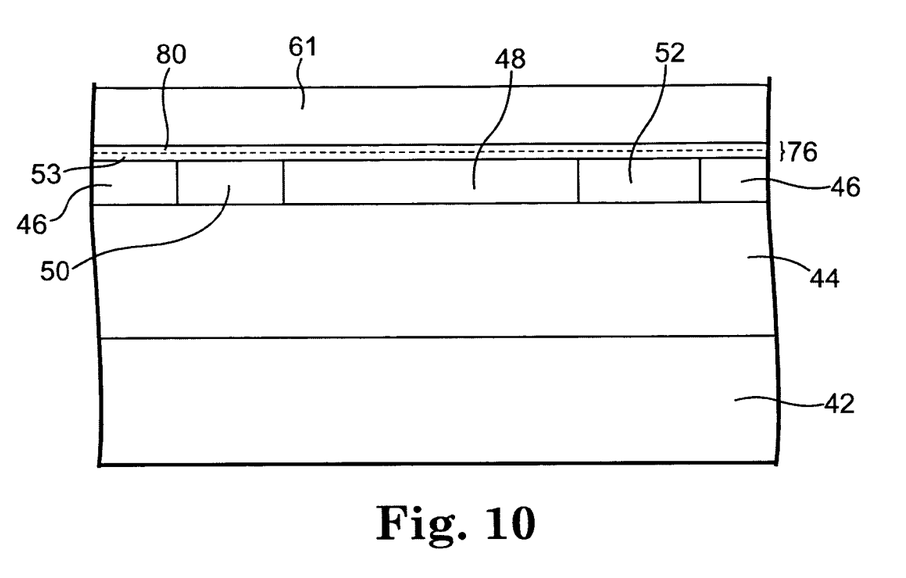
FIG. 10 is a schematic cross-sectional view of the thin-film structure of FIG. 9 wherein a portion of the thin-film structure has been removed to define the silicon-insulator-silicon thin-film structure.
Figure 11:
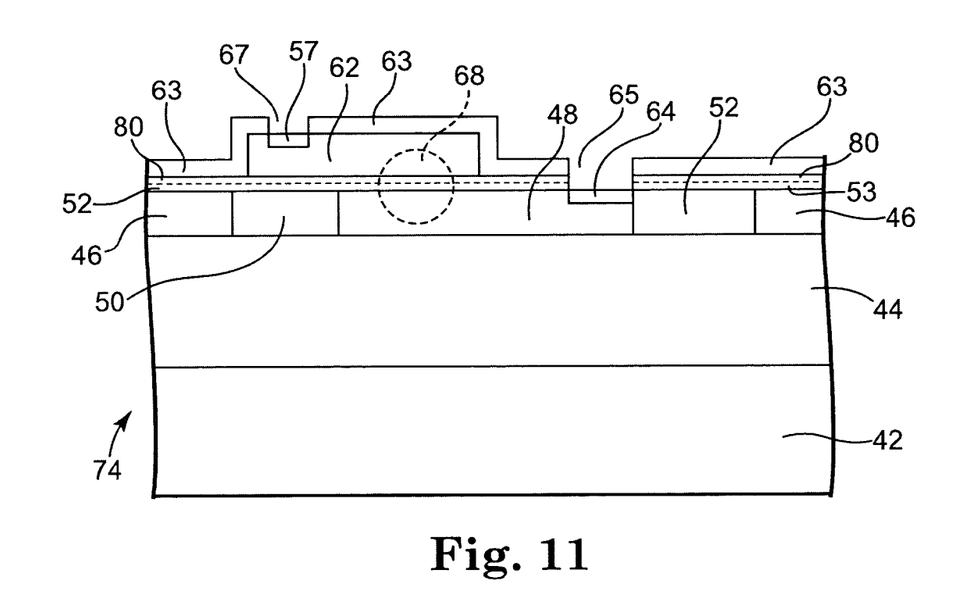
FIG. 11 is a schematic cross-sectional view of the thin-film structure of FIG. 10 with a layered silicon-insulator-silicon structure in accordance with the present invention that can be used to form an optical modulator.

Next, as shown in FIG. 7, a thin-film dielectric layer 53 is preferably deposited over the first device layer 48 and the oxide filled trench 49, as illustrated. The thin-film dielectric layer 53 preferably provides at least a portion of a functional device layer over at least part of the first silicon device layer 48 for electro-optically creating an optical modulator such as can be provided by the thin-film structure 74 shown in FIG. 11. The structure including the first device layer 48 and the thin-film dielectric layer 53 preferably provides a first modulator component. After the thin-film dielectric layer 53 is deposited, a single crystal silicon layer 61 (or polycrystalline silicon layer) preferably is provided as part of a second modulator component, and positioned such as by a layer transfer process, and bonded to the first modulator component to eventually form a second silicon device layer 62 (see FIG. 11). As illustrated in FIGS. 10 and 11, and described in more detail below, the transferred second silicon layer 61 may include a thin-film dielectric layer 80 as part of the second modulator component, which thin-film dielectric layer 80 together with the dielectric layer 53 can form a functional device dielectric device layer 76. For example, silicon dioxide may be thermally grown or deposited using conventional low pressure chemical vapor deposition (LPCVD) to form either or both of the dielectric layers 53 and 80. The thickness of each of the dielectric layers 53 and 80 may contribute to the thickness of the functional device layer 76 in any proportion. Also, as described in more detail below, it is not necessary to provide both of the layers 53 and 80 to form the device layer 76. That is, the device layer 76 may be formed as a single layer in accordance with the present invention and can be provided, such as by a deposition technique, to either of the first device layer 48 or the second silicon layer 61. Preferably, the dielectric device layer 76 comprises a thickness that is preferably less than 100 angstroms for functionality with an optical modulator. Moreover, any of the thin-film dielectric layers 53 and 80 may be formed from or include other dielectric materials, or combination thereof, such as silicon nitride, aluminum oxide, aluminum nitride, as well as those materials generally characterized as titanates. Any deposition techniques may be used such as those including chemical vapor deposition, physical vapor deposition, and the like.

In accordance with a preferred aspect of the present invention, at least a portion of second silicon device layer 62 that comprises a part of a functional optical modulator (where the first and second device layers 48 and 62 overlap with thin-film dielectric layer 76 in between) comprises a single crystal structure for increased carrier mobility. Patterning of the second silicon layer 61 may be done by any known or developed silicon etching or removal technique to preferably create an island of silicon as the second device layer 62. Doping of the second device layer 62 may be done in any manner, such as described above with respect to first device layer 48. That is, preferably, the second device layer 62 is doped to form an n-type active region for an optical modulator but the second device layer 62 may be doped to form a p-type active region if desired. Such doping can be done at any time before, after, or during formation of the second device layer 62. However, such doping is preferably performed in a manner that minimizes the possibility of undesirable thermal diffusion of dopant species. In particular, the second silicon layer 61 can be doped before it is patterned and etched to form the second silicon device layer 62 or doping can be done after the second silicon device layer 62 is formed.

Preferably, the second silicon device layer 62 is doped sufficiently to provide an n-type material suitable for use in optical modulation. Conventionally known photolithography and ion implantation processes may be used, for example to perform the material doping. It is noted that such doping may change the free carrier mobility of the second device layer 62 such that it is different from the free carrier mobility of the initial second silicon layer 61. In any case, it is preferred to start with a high mobility material such as the silicon layer 61 to form the second device layer 62. Additionally, as mentioned above, the second device layer 62 is preferably sufficiently doped to form an active region capable of achieving the desired modulation performance. For example, by starting with the silicon layer 61 with the above noted free carrier mobility, an active region can be formed that is capable of achieving high modulation performance (greater that $1 \times 10^9$ hertz).

With reference to FIG. 11, a cap layer 63, such as silicon dioxide or the like is preferably formed over the patterned second device layer 62 as shown. The cap layer 63 can be formed by any desired technique such as plasma enhanced chemical vapor deposition or other suitable technique. The patterning, doping, and bonding steps for forming the thin-film structure 74 shown in FIG. 11 can be performed in any desired order although any desired thermal processing that could cause dopant diffusion in the second device layer 62 is preferably done before doping to minimize any potential diffusion effects of the dopant.

The second silicon layer 61 is preferably patterned to form the second device layer 62 and to create a structure wherein a portion of the first device layer 48 can be accessed for forming a contact 64 to the first device layer 48 such as illustrated. The contact 64 is preferably an ohmic contact and can be formed by conventionally known techniques that may include forming an opening 65 through the cap layer 63 and the dielectric layer 53 to provide access to a surface of the first device layer 48. The contact 64 is preferably created at a point sufficiently spaced from a guiding region 68 to minimize potential absorption related loss effects that can be caused by metal materials as mentioned above. The second device layer 62 is also preferably patterned to create a structure so that a contact 67 can be provided to the second device layer 62 and such that the contact 67 is also sufficiently spaced from the guiding region 68 to minimize potential absorption related loss effects that can be caused by such contacts. The contact 67 is also preferably an ohmic contact and can be formed by conventionally known techniques that may include forming an opening 67 in the cap layer 63 to provide access to the second device layer 62.

In accordance with an aspect of the present invention, the second device layer 62 is preferably at least partially crystallized so that a crystalline or polycrystalline region with enhanced carrier mobility is provided in at least an active portion of the guiding region 68. Any process can be used that is capable of at least partially crystallizing a silicon layer, such as an amorphous silicon layer, to provide a desired mobility. Moreover, any process capable of improving the free carrier mobility of a silicon material, whether crystalline or not, may be used. Such a technique can be used to improve the crystallinity, such as by reducing defects or the like, of a crystalline, polycrystalline or partially crystalline silicon layer for the purpose of improving free carrier mobility. For example, crystallization of deposited silicon films by furnace, lamp, and laser techniques can be used.

Preferably, the second device layer 62 is at least partially crystallized, more preferably single crystal, to have carrier mobility that is preferably at least 20%–25% of the mobility of the active region of the first silicon layer. Accordingly, the second silicon layer is preferably formed from silicon material that has a mobility that is at least 20%–25% of the mobility of the material that is used to form the first silicon layer. To further improve the modulation performance, it is preferable to have the second layer mobility at about 50%, and most preferably close to 100%. Thus, the initial silicon material for forming the active region of the second silicon layer preferably has a mobility of about 50%, and most preferably close to 100% of the initial silicon material for the active region of the first silicon layer.

The second device layer 62 can be provided in any desired way. For example, as described below, in one aspect of the present invention, the second silicon layer 62 can be provided as a single crystal layer formed on a separate substrate. The layer 62 can then be transferred and bonded to the dielectric device layer 76 thereby providing the second device layer 62. In another aspect of the present invention, a single crystal substrate can be bonded to the dielectric device layer 76 and a portion of the substrate can be removed to define the thickness of the second device layer 62. Any chemical or mechanical techniques may be used to remove a portion of the substrate such as wet or dry etching or mechanical lapping or polishing. It is contemplated that single crystal material for the second device layer 62 can also be deposited on a substrate by a suitable deposition technique such as molecular beam epitaxy (MBE) or metal organic chemical vapor deposition (MOCVD) in order to form a layer on the substrate that can be transferred in accordance with the present invention. Moreover, a single crystal layer to be transferred to provide the second device layer 62 can be formed by crystallization of an amorphous or polycrystalline layer that has been deposited or otherwise formed on a substrate, for example. Any such process can be used to define a single crystal layer having a predetermined thickness and a layer transfer technique, as described in more detail below, can be used to form a thin-film structure such as the thin-film structure 74 shown in FIG. 11. Any additional processing steps may be used to provide a single crystal material for the second device layer 62 in accordance with the present invention.

In accordance with the present invention, a layer transfer process can be used to form the silicon-insulator-silicon structure defined by the silicon layer 48, the dielectric device layer 76, and the silicon layer 61 as shown in FIG. 10 and described above which can thus be further processed to provide the thin-film structure 74 shown in FIG. 11. Generally, a layer transfer process can include any process or technique that can transfer one or more layers or portions of a first substrate to a second substrate. For example, in one embodiment of the present invention, a first substrate having a silicon layer and a dielectric layer formed thereon can be provided and a second substrate, also having a silicon layer and a dielectric layer formed thereon can be provided. The dielectric layer of the first substrate can then be bonded to the dielectric layer of the second substrate to form a silicon-insulator-silicon structure in accordance with the present invention. As described below, the second substrate can then be removed thereby effectively transferring the silicon layer and the dielectric layer of the second substrate to the first substrate. In other aspects of the present invention, a dielectric layer does not need to be provided on both of the first and second substrates. For example, a dielectric layer can be provided on a silicon layer of a first substrate. A silicon layer of a second substrate can then be bonded to the dielectric layer of the first substrate to form a silicon-insulator-silicon structure in accordance with the present invention.

In one aspect of the present invention, a bonding process, preferably a thermal bonding process, can be used as part of a layer transfer process to bond any desired layers or layer portions together in order to form a desired thin-film structure. By such a bonding process, layers can be joined or fused with each other in order to form a functional interface for different materials of an optical modulator or to form a single functional layer where like materials are bonded together. For example, a silicon-insulator-silicon structure can be formed by bonding silicon layer 48 to the dielectric device layer 76 or by bonding the silicon layer 61 to the dielectric device layer 76. Such bonding can be done at any point in the fabrication of the device.

Any of the silicon layer 48, the dielectric layer 76, and the silicon layer 62 can be formed by a bonding technique to form a silicon-insulator-silicon structure in accordance with the present invention. Bonding such materials together also creates an interface between the materials, which may be characterized as a thermally bonded interface. For certain materials, such an interface may be identifiable by known characterization techniques such as transmission electron microscopy (TEM), scanning electron microscopy (SEM), or secondary ion mass spectrometry (SIMS) as a few examples. In any case, any characteristics of a thermally bonded interface in accordance with the present invention that are understood by those skilled in the art may be used to identify such an interface either between like materials or different materials.

More specifically, exemplary layer transfer processes that can be used for forming silicon-insulator-silicon thin-film structures for optical modulators are described below with respect to FIGS. 7–10. Referring to FIG. 7, the substrate 42 is shown. Preferably, as previously described, the substrate 42 additionally includes a thin-film structure including buried oxide layer 44, single crystal silicon layer 48, and dielectric layer 53 (preferably silicon dioxide layer) having surface 58. Preferably, the single crystal silicon layer 48 is doped in order to provide an n-type active region but may be p-type if desired.

Figure 8:
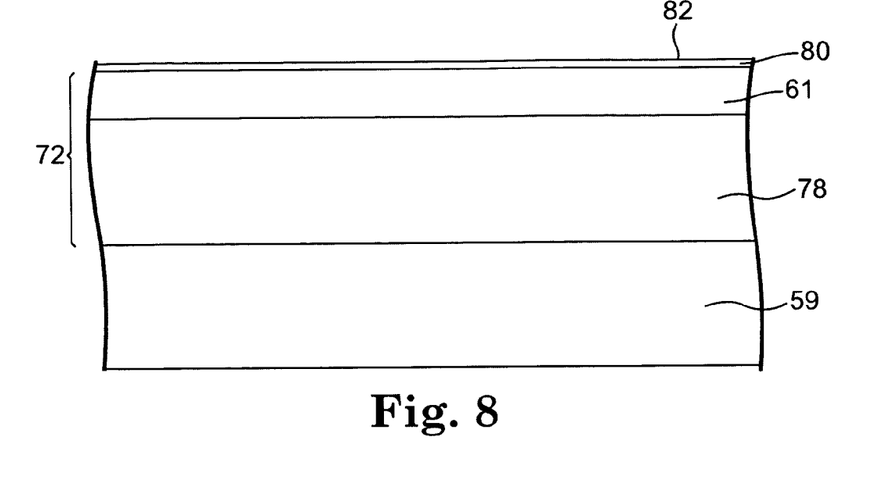
FIG. 8 is a schematic cross-sectional view of a thin-film structure with a silicon layer that can be bonded to the thin-film dielectric layer of the layered structure of FIG. 7 to provide a second silicon device layer in accordance with an aspect of the present invention.

In FIG. 8, a second substrate 59 is shown, which can be used to form a silicon-insulator-silicon structure in accordance with the present invention. As illustrated, the second substrate 59 preferably additionally includes a silicon-on-insulator structure 72. The silicon-on-insulator structure 72 of the second substrate 59 preferably includes a single crystal silicon material as the silicon layer 61 and buried oxide layer 78. Such substrates including single crystal silicon-on-insulator structures are available commercially and can be used to form optical modulator structures in accordance with the present invention in an efficient and cost effective manner. Preferably, at least a portion of single crystal silicon layer 61 is doped in order to provide a p-type active region (or n-type, if desired), in accordance with the present invention as described above.

As illustrated, a dielectric layer 80 having surface 82 is preferably provided on the single crystal silicon layer 61. The dielectric layer 80 can be deposited on the single crystal silicon layer 61 by any suitable technique. Preferably, the material that is used for the dielectric layer 80 is the same as the material used for the dielectric layer 53 of the substrate 42, however, different materials may be used as long as they can be bonded in accordance with the present invention and can provide a dielectric device layer, such as the device layer 76, for an optical modulator. Also, the thickness of the dielectric layer 53 and the thickness of the dielectric layer 80 are preferably chosen so that the combined thickness of the dielectric layer 53 and the dielectric layer 80 provides a desired functional thickness for the dielectric device layer 76 in accordance with the present invention. It is contemplated, however, that the thickness of the dielectric layer 53 and the thickness of the dielectric layer 80 may be different from one another.

While a dielectric layer is described and illustrated on both of the substrate 42 and the substrate 59, this is simply one way of forming a silicon-insulator-silicon structure in accordance with the present invention. Providing a dielectric layer on both substrates such as layers 53 and 80 can make it easier to subsequently bond the dielectric materials to each other, especially where they comprise like materials to cooperatively form the dielectric layer 76. It is noted, however, that the dielectric device layer 76 can be provided fully as a layer on the silicon layer 48 or the silicon layer 61. In any case, the present invention contemplates forming a silicon-insulator-silicon structure by bonding any of the layers or portions of the layers of the structure.

Figure 9:
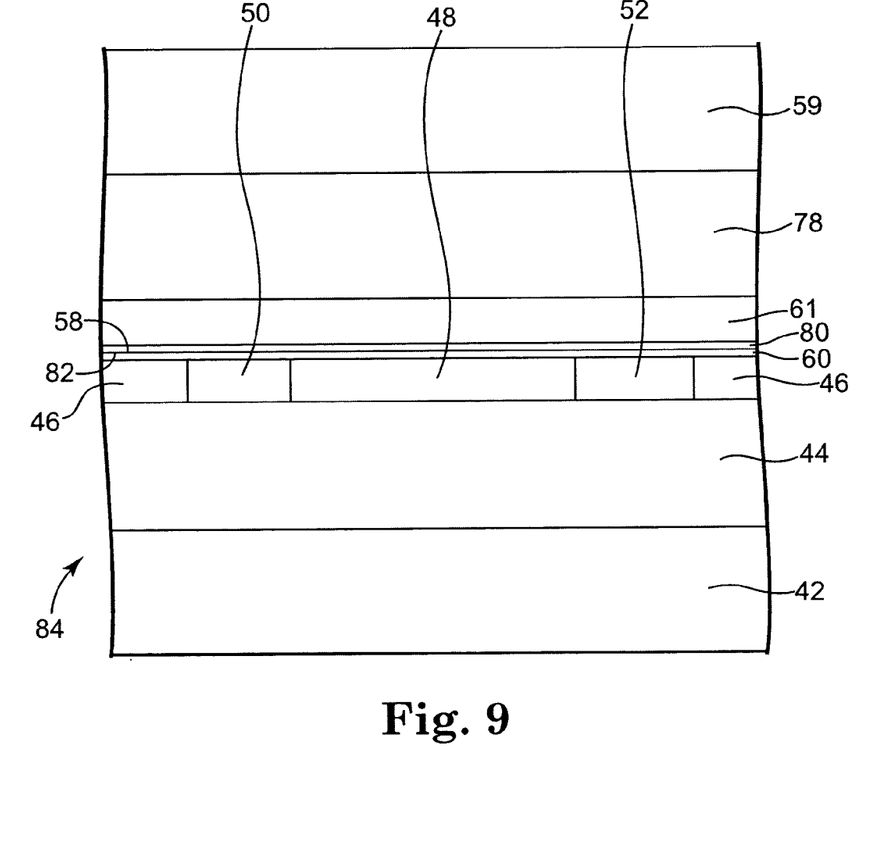
FIG. 9 is a schematic cross-sectional view of a thin-film structure that includes the thin-film structure of FIG. 8 and the layered structure of FIG. 7 wherein the silicon layer of the thin-film structure of FIG. 8 and the silicon layer and the dielectric layer of the layered structure of FIG. 7 form a silicon-insulator-silicon structure in accordance with an aspect of the present invention.

Referring to FIG. 9, the surface 82 of the dielectric layer 80 is shown positioned with respect to the surface 58 of the dielectric layer 53 so that the surface 82 can be bonded to the surface 58 to form thin-film structure 84. This provides the ability to transfer the layer 80 from the substrate to the layer 60. Preferably a thermal bonding technique is used. For example, the wafer surfaces 58 and 82 can be positioned in close contact with each other in a furnace to cause such bonding to take place. Generally, the wafer surfaces 58 and 82 can be fused by increasing the temperature of the substrates 42 and 59 (and the layers therefrom) to a temperature that is sufficient to allow the surfaces 58 and 82 to integrate or fuse at a molecular level.

Preferably, the dielectric layer 80 and the dielectric layer 53 are bonded or fused together to form the functional device dielectric layer 76 for forming the thin-film structure 74 shown in FIG. 11. However, as noted above, the dielectric layer 76 can be provided as a single layer, which layer may be bonded to a silicon layer (such as one of silicon layers 48 and 61) to form the thin-film structure 74. Such bonding processes are known in the art such as described in U.S. Pat. No. 6,372,609 to Aga et al., the entire disclosure of which is incorporated by reference herein for all purposes. It is further contemplated that any bonding, joining, or fusing process may be used to form a bonded structure in accordance with the present invention. Such bonding techniques may include using the temperature, pressure, ultrasonic energy or other technique capable of joining thin-film layer surface for forming a thin-film structure for an optical modulator. Moreover, any number of preparatory steps, such as cleaning or treating of the surfaces to be bonded, are contemplated.

In accordance with this exemplary thin-film structure 84, the buried oxide layer 78 and the second substrate 59 are preferably removed to leave the functional single crystal silicone layer at a desired thickness to function within an optical modulator. This can be done in any desired manner such as by mechanical grinding or lapping, chemical etching, dry etching, or combinations thereof. In one exemplary process, the second substrate 59 can be lapped until a thin layer of the second substrate remains (10 microns to 100 microns, for example). The thin layer that remains can then be removed by a wet or dry etching process as are well known in the art. This preferably exposes the buried oxide layer 78. Next, the buried oxide layer 78 can be removed by wet etching or other suitable process to expose the silicon layer 61. The structure shown in FIG. 10 can then be further processed as described above to form the structure shown in FIG. 11. In particular, layer 61 can be patterned and etched to form device layer 62 as shown in FIG. 11. If desired, the silicon layer 61 may be thinned by oxidizing a thin layer portion of the silicon layer 61 and etching the oxidized layer portion as is well known in the art. Standard wafer processing techniques can be used to define the thin-film structure in accordance with the invention.

In another exemplary layer transfer technique, a single crystal silicon layer (such as layer 61) may include a weakened layer or region that can be used to separate the single crystal layer 61 and the substrate (substrate 59, for example) into first and second portions defined by the weakened region. For example, a process such as SOITEC's Smart Cut™ process can be used to provide the weakened region. Generally, the Smart Cut™ process uses ion implantation or injection of hydrogen atoms or rare gas atoms along a common plane within the silicon layer (such as silicon layer 61) to form a weakened region or layer at a predetermined depth of a silicon substrate or silicon thin-film. The wafer can subsequently be cleaved along that weakened layer to have a thickness defined by the depth of the ion implanted region. The Smart Cut™ process is described in U.S. Pat. No. 6,372,609 to Aga et al., the entire disclosure of which is incorporated by reference herein.

Preferably, during a bonding process as described above, the single crystal silicon layer fractures along the weakened region so that a portion of the single crystal layer can be removed. That is, because the implanted hydrogen atoms generally form a bubble layer and heating causes bubble cohesion and crystal rearrangement, the portion can be delaminated. This technique can be used for example to form the structure that is shown in FIG. 10. As such, the thickness of the layer 61 can be controllably defined based on operationally needs. It is contemplated that other techniques can be used to define the thickness of the layer 61. Mechanical grinding or polishing including chemical mechanical polishing can also be used. Also, wet or dry etching processes can be used as previously described. In any of these processes, additional layers may be used to define etch stops, for example.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A method of making a silicon-insulator-silicon thin-film structure for an optical modulator, the method comprising the steps of:

providing a first substrate, the first substrate comprising a silicon-on-insulator structure, the silicon-on-insulator structure having a silicon layer and a buried oxide layer;

providing a second substrate comprising a silicon layer;

providing a thin-film dielectric layer having a predetermined thickness to function within a waveguide of an optical modulator of at least a portion of an exposed silicon surface of one of the silicon layers of the first and second substrates to create first and second modulator components; and positioning the first modulator component to overly at least a portion of the second modulator component thereby forming a silicon-insulator-silicon thin-film structure within which a waveguide of an optical modulator is created;

wherein the step of positioning further comprises the step of bonding at least a portion of the first modulator component to at least a portion of the second modulator component.

2. The method of claim 1, wherein the step of bonding at least a portion of the first modulator component to at least a portion of the second modulator component comprises thermally fusing at least a portion of a surface of the first modulator component to at least a portion of a surface of the second modulator component.

3. The method of claim 1, further comprising removing at least a portion of the second modulator component after positioning the first modulator component with respect to the second modulator component to at least partially define a waveguide structure of an optical modulator.

4. The method of claim 1, wherein the step of providing a thin-film dielectric layer comprises depositing a thin-film dielectric material on at least a portion of an exposed silicon surface of the silicon layer of the first substrate to create a first modulator component, the thin-film dielectric layer having an exposed surface.

5. The method of claim 4, wherein the step of positioning the first modulator component with respect to the second modulator component comprises positioning the exposed surface of the dielectric layer of the first substrate with respect to an exposed silicon surface of the second substrate.

6. The method of claim 5, further comprising the step of bonding at least a portion of the exposed surface of the dielectric layer of the first modulator component to at least a portion of the exposed silicon surface of the second substrate to form the silicon-insulator-silicon thin-film structure.

7. The method of claim 6, wherein said bonding comprises thermally fusing at least a portion of the exposed surface of the dielectric layer of the first substrate to at least a portion of the exposed silicon surface of the second substrate to form the silicon-insulator-silicon thin-film structure.

8. The method of claim 7, further comprising removing at least a portion of the silicon layer of the second substrate to define a silicon device layer for an optical modulator, the silicon device layer having a predetermined thickness.

9. The method of claim 1, wherein the step of providing a thin-film dielectric layer comprises depositing a thin-film dielectric material on at least a portion of an exposed silicon surface of the second substrate to create the second modulator component, the thin-film dielectric layer having an exposed surface.

10. The method of claim 9, wherein the step of positioning the first modulator component with respect to the second modulator component comprises positioning an exposed silicon surface of the first substrate with respect to the exposed surface of the dielectric layer of the second substrate.

11. The method of claim 10, further comprising the step of bonding at least a portion of the exposed silicon surface of the first substrate to at least a portion of the exposed surface of the dielectric layer of the second modulator component to form the silicon-insulator-silicon thin-film structure.

12. The method of claim 11, wherein said bonding comprises thermally fusing at least a portion of the exposed silicon surface of the first substrate to at least a portion of the exposed surface of the dielectric layer of the second modulator component to form the silicon-insulator-silicon thin-film structure.

13. The method of claim 12, further comprising removing at least a portion of the silicon layer of the second substrate to define a silicon device layer for an optical modulator, the silicon device layer having a predetermined thickness.

14. The method of claim 1, wherein the step of providing a thin-film dielectric layer comprises depositing a thin-film dielectric material on at least a portion of an exposed silicon surface of the silicon layer of the first substrate to create the first modulator component and depositing a thin-film dielectric material on at least a portion of an exposed silicon surface of the second substrate to create the second modulator component, the thin-film dielectric layer of the first modulator component having an exposed surface and the thin-film dielectric layer of the second modulator component having and exposed surface.

15. The method of claim 14, wherein the step of positioning the first modulator component with respect to the second substrate comprises positioning the exposed surface of the dielectric layer of the first modulator component with respect to the exposed surface of the dielectric layer of the second modulator component.

16. The method of claim 15, further comprising the step of bonding at least a portion of the exposed surface of the dielectric layer of the first modulator component to at least a portion of the exposed surface of the dielectric layer of the second modulator component to form the silicon-insulator-silicon thin-film structure.

17. The method of claim 16, wherein said bonding comprises thermally fusing at least a portion of the exposed surface of the dielectric layer of the first modulator component to at least a portion of the exposed surface of the dielectric layer of the second modulator component to form the silicon-insulator-silicon thin-film structure.

18. The method of claim 17, further comprising removing at least a portion of the silicon layer of the second substrate to define a silicon device layer for an optical modulator, the silicon device layer having a predetermined thickness.

* * * * *